United States Patent
Khokhlov

(10) Patent No.: US 9,811,916 B1
(45) Date of Patent: Nov. 7, 2017

(54) APPROACHES FOR HEAD TRACKING

(71) Applicant: Amazon Technologies, Inc., Reno, NV (US)

(72) Inventor: Dmitri Yurievich Khokhlov, Mountain View, CA (US)

(73) Assignee: Amazon Technologies, Inc., Reno, NV (US)

(*) Notice: Subject to any disclaimer, the term of this patent is extended or adjusted under 35 U.S.C. 154(b) by 121 days.

(21) Appl. No.: 14/037,261

(22) Filed: Sep. 25, 2013

(51) Int. Cl.
G06T 1/00 (2006.01)
G06T 7/20 (2017.01)
G06T 7/00 (2017.01)

(52) U.S. Cl.
CPC .......... G06T 7/2006 (2013.01); G06T 7/0075 (2013.01)

(58) Field of Classification Search
CPC .. G06K 9/00369; G06K 9/32; G06K 9/00201; G06K 2009/3291; G06K 9/00355; G06K 9/00375; G06K 9/3241; G06K 9/00362; G06K 9/00389; G06K 9/6228; G06T 2207/30196; G06T 2207/20144; G06T 7/0083; G06T 7/2006; G06T 7/0075; G06T 2207/30201; G06T 7/12; G06T 7/11

See application file for complete search history.

(56) References Cited

U.S. PATENT DOCUMENTS

| | | | | |
|---|---|---|---|---|
| 2009/0252423 A1* | 10/2009 | Zhu | ................... | G06K 9/00201 382/209 |
| 2010/0215271 A1* | 8/2010 | Dariush | ............. | G06K 9/00369 382/180 |
| 2010/0303290 A1* | 12/2010 | Mathe | .................... | G06T 17/05 382/103 |
| 2011/0286633 A1* | 11/2011 | Wang | ................. | G06K 9/00771 382/103 |
| 2013/0190086 A1* | 7/2013 | Maison | ............. | G06K 9/00369 463/31 |
| 2014/0270540 A1* | 9/2014 | Spector | ................. | G06T 7/0087 382/199 |

* cited by examiner

Primary Examiner — Kenny Cese
(74) Attorney, Agent, or Firm — Polsinelli LLP

(57) ABSTRACT

The location of a user's head, for purposes such as head tracking or motion input, can be determined using a two-step process. In a first step, at least one image is captured including a representation of at least a portion of the user, with distance information also being obtained. The distance information can be used to segment the at least one image into a foreground portion, which then can be analyzed to recognize a head and shoulder signature of a user. In a second step, a contour of the foreground portion can be determined, and a center point of that contour determined. The distances from the center point to locations along the contour can be used to locate transition points associated with the head and shoulders. A center point of the portion of the contour between the transition points gives an approximation of the relative head position.

20 Claims, 10 Drawing Sheets

APPROACHES FOR HEAD TRACKING

BACKGROUND

As the functionality offered by computing devices continues to improve, users are utilizing these devices in different ways for an increasing variety of purposes. For example, certain devices utilize one or more cameras to attempt to detect motions or locations of various objects, such as for head tracking or motion input. Continually analyzing full resolution images can be very resource intensive, and can quickly drain the battery of a mobile device. Further, such approaches are often sensitive to variations in lighting conditions. Using lower resolution cameras and less robust algorithms, however, can lead to an increase in the number of false positives and/or a decrease in the accuracy of the object tracking process.

BRIEF DESCRIPTION OF THE DRAWINGS

Various embodiments in accordance with the present disclosure will be described with reference to the drawings, in which.

DETAILED DESCRIPTION

Figure 1A:
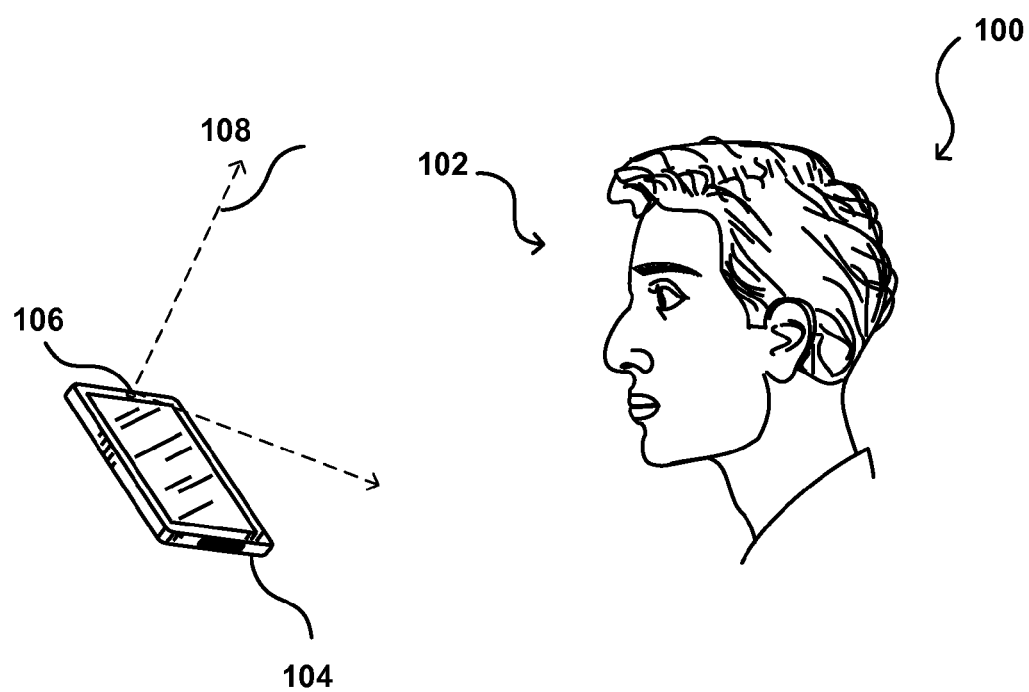
FIGS. 1(a) and 1(b) illustrate an example of how a device might use an image to perform head tracking in accordance with various embodiments.

Systems and methods in accordance with various embodiments of the present disclosure may overcome one or more of the aforementioned and other deficiencies experienced in conventional approaches to determining the position of one or more objects with respect to an electronic device. In particular, various embodiments utilize distance information with image data to determine the presence and/or location of at least one object of interest, such as a head or body of a user. In one embodiment, image data (e.g., still image or video) with depth information is acquired to attempt to locate such an object. The depth or distance information can be obtained in a number of different ways, such as by capturing stereoscopic or three-dimensional image data, or by using a proximity or distance sensor, among other such options. The distance information can be used to designate objects within a determined distance of the device as foreground objects, eliminating other objects from consideration as background objects. The determined distance can be set such that the distance includes the typical distance a user would be from a computing device with which that user is interacting. If more than one such object exists, the largest object can be selected as the user, although other approaches can be used as well, such as to use shape or object recognition processes. In some embodiments, an object location algorithm might look for objects in the image data that meet a certain object detection criterion, such as objects (e.g., areas of a relatively common intensity in an image) of a certain size, shape, and/or location. In some embodiments, the image data represents infrared (IR) light emitted by the device, reflected by the object, and detected by the device.

Once a foreground object has been identified, a contour of that object can be determined. This can include, for example, determining an edge region or portion of the foreground object, and then selecting a set of pixels that are representative of the edge, such as to provide a relatively continuous contour line that is approximately one pixel in line width. Various averaging or interpolation or other such processes can be used to attempt to generate an appropriate set of contour pixels in at least some embodiments. One or more image processing routines can be used to attempt to obtain a relatively smooth contour with few gaps or holes. In some embodiments, verification can be performed to ensure that the contour of the object substantially corresponds to a signature of a head and shoulders of a user. A center point, such as a center of mass or centroid, then can be calculated for the contour. The distance from this center point to each pixel location along the contour then can be determined, in an attempt to locate the two shortest distances (or at least one such distance in various embodiments). These shortest distances can be determined to correspond to the approximate locations where the user's neck meets the user's shoulders. These "transition" points then can be used to quickly identify a portion of the object and/or contour that corresponds substantially to the user's head. Another centroid then can be calculated, in at least some embodiments, for the portion of the object or contour that is between the located transition points. The coordinates of this centroid then can be determined to correspond to the approximate head location of the user. Information associated with these coordinates then can be used to determine and/or track the relative position of a user's or viewer's head with respect to the computing device.

Various other functions and advantages are described and suggested below as may be provided in accordance with the various embodiments.

FIG. 1(a) illustrates an example situation 100 wherein a user 102 is viewing and/or interacting with a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a complementary metal-oxide-semi-conductor (CMOS) device, a motion detection sensor, or an infrared image sensor, or can utilize another appropriate image capturing technology. In this example, the device 104 is analyzing image data captured by the image capture element 106 to attempt to determine whether the head of the user is present in the field of view 108 of the camera 106. If so, the device will attempt to determine the relative position of the user's head to the device, in order to determine how to render content on a display of the device or perform another such action.

Figure 1B:
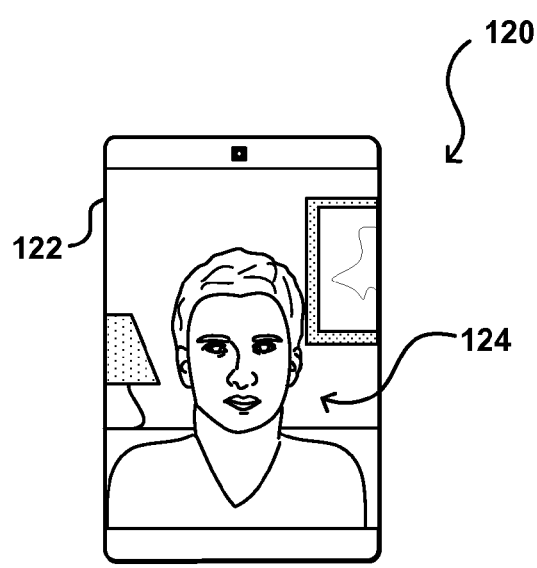

For example, as illustrated in the example 120 of FIG. 1(*b*), a portion of the user 124 is represented in an image captured by the device, here displayed on a display screen 122 of a computing device for simplicity of explanation, although such display is not utilized in many embodiments. As illustrated, the head and shoulders of the user are represented in the image. As illustrated, there are also several other objects in the image, including objects such as a painting, a lamp, and a desk. In order to determine the position of the user, it is necessary to first identify the portion of the image that corresponds to the user's head. Conventional approaches use object recognition or other such processes to attempt to recognize the head based on various features, patterns, or other such information. These processes can be very resource intensive, particularly when analyzing large, full color images. The processing required also can limit the frequency at which the head can be tracked, providing for less precision than may otherwise be desired.

Figure 2A:
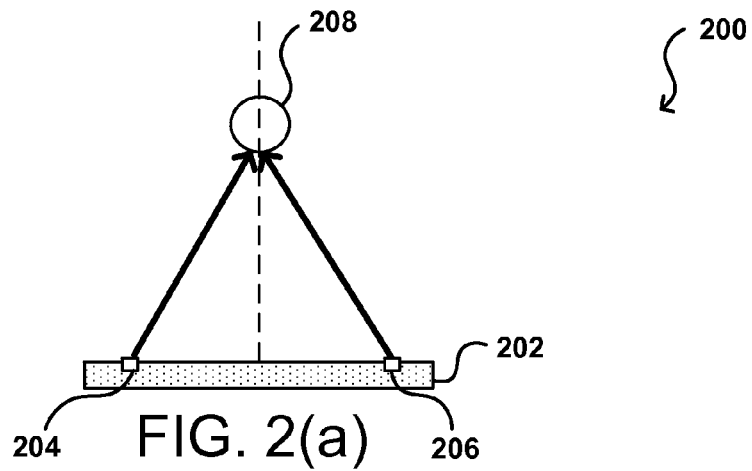
FIGS. 2(a), 2(b), 2(c), and 2(d) illustrate an example situation for a computing device illustrating changes in relative head position can be determined using a set of images in accordance with various embodiments.
Figure 2B:
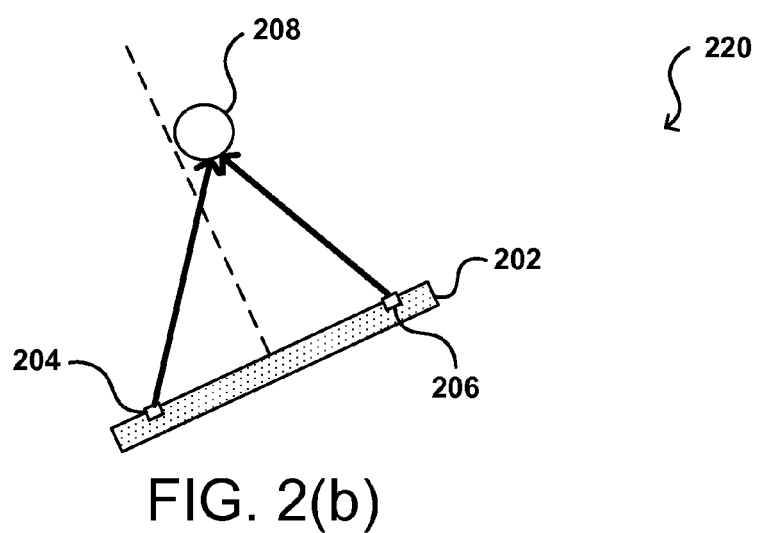
Figures 2C, 2D:
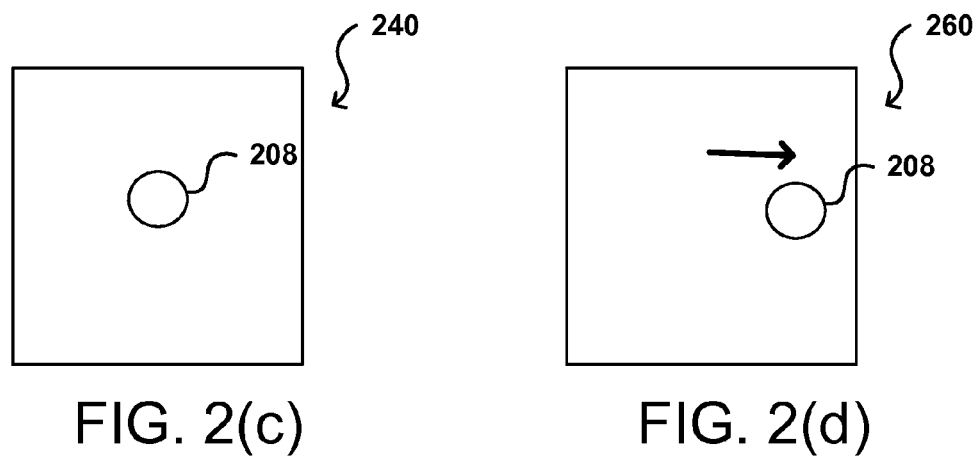

For example, the head location is determined in a set of subsequently captured images, with these locations then compared for purposes of head tracking. The speed with which images can be analyzed limits the number of head positions that can be compared. FIG. 2(*a*) illustrates a top view 200 of a situation wherein the user's head 208 is relatively centered with respect to the display screen (i.e., along a normal vector to the center of the screen). In this example, the computing device 202 has a pair of cameras 204, 206 that are configured to capture stereoscopic image data such that the disparity information can be used to determine, in three dimensions, the relative location of the head to the device. Methods for determining distance using disparity data are well known in the art and, as such, will not be discussed in detail herein. The pair of cameras can be part of a single camera assembly that can be used to capture stereoscopic images, or other types of three-dimensional data, where offsets in position (or disparity) due to the offset of the cameras can be used to calculate distance, and can be used to render an image that appears to a user to show objects at their respective distances. In some embodiments, a camera assembly might include a single camera or sensor for capturing images that are able to be used to infer three-dimensional position information. For example, a camera assembly might include an infrared (IR) emitter and capture reflected IR such that distance can be inferred by the relative intensity of the reflected IR. In other embodiments, a camera assembly might include a single camera with a proximity sensor or distance sensor, for example, such that the camera assembly can provide both image and distance data, which can be used to calculate three-dimensional position information. A proximity or distance sensor can include, for example, an ultrasonic sensor, an electromagnetic sensor, a capacitive sensor, a magnetic sensor, and the like, which is able to determine a distance to one or more objects with respect to the sensor. Various other types of camera assemblies can be used as well within the scope of the various embodiments.

If the device 202 is rotated and/or the head 208 moves as illustrated in the example situation 220 of FIG. 2(*b*), the head may no longer be in the same location along the normal, but may be offset in the captured image data. For example, the image 240 in FIG. 2(*c*) illustrates the head 208 in the center of the image, while the image 260 in FIG. 2(*d*) illustrates that the position of the head 208 has shifted in the image due to the change in relative position. It should be understood that the images 240, 260 can be three-dimensional images generated using the images captured by each of the stereo cameras 204, 206.

In order for such a process to work in varying lighting conditions, the device might use a light source to illuminate the head or other such object. Since flashing or directing light from a white light source at a user may be distracting, and potentially power intensive, various devices might instead utilize IR light, or radiation of another such wavelength, band, or range. In this way, the IR light can be emitted as needed without being detectable by the user, and the reflected IR light can be detected by at least one camera sensor of the device. It should be understood that stereoscopic imaging is not required, and that other ways of determining depth information for an object represented in an image can be used as well within the scope of the various embodiments. These can include, for example, a single image with structured light data captured using a structured light assembly, varying intensity data due to different amounts of reflected light, proximity sensor data, and the like. As known in the art, a structured light assembly can determine distance and shape data by projecting a pattern of light and examining the light reflected back by one or more objects to determine variations in the reflected pattern that are indicative of shape and distance. Differences in intensity data can be used to infer distance, as the amount of light reflected by an object drops off as the distance to that object increases.

Figure 3:
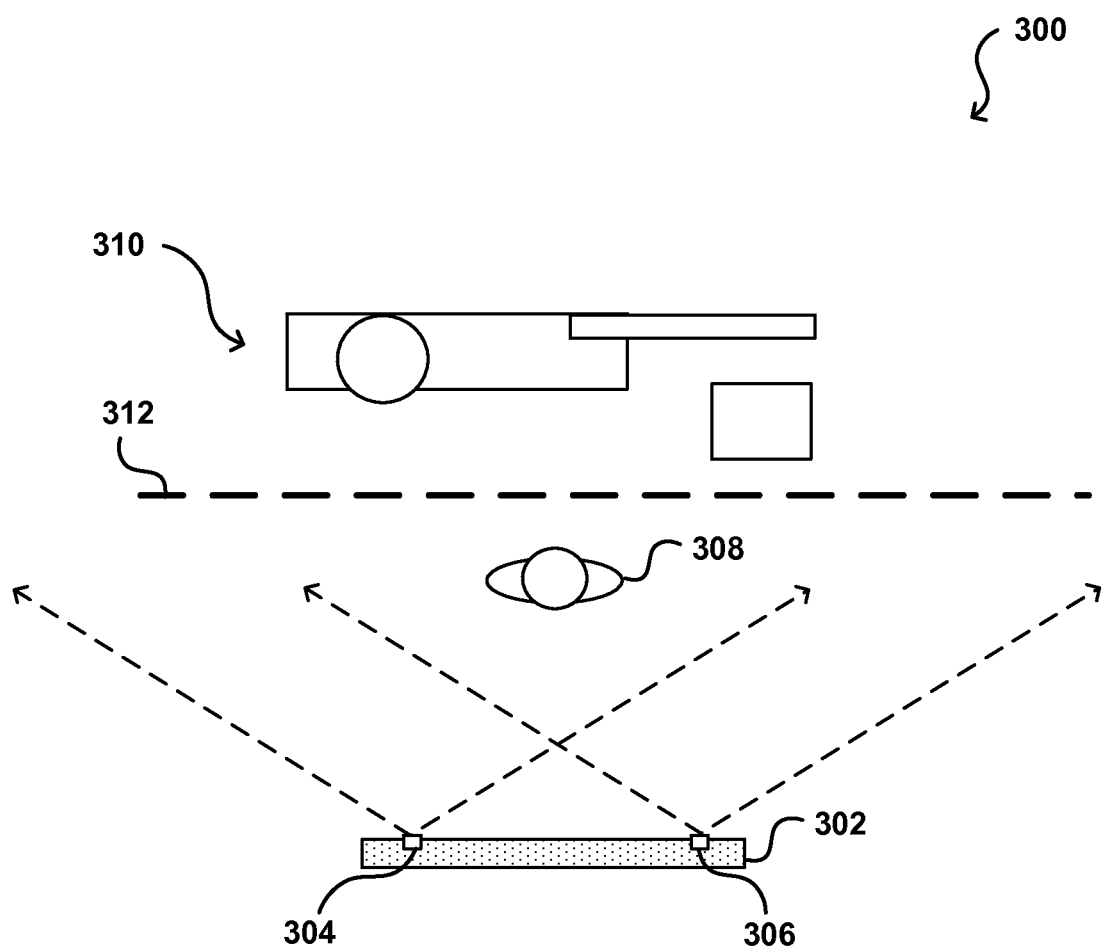
FIG. 3 illustrates an example distance thresholding approach that can be used to segment foreground and background portions of an image in accordance with various embodiments.

When analyzing each of the images to attempt to determine the head position, it can be beneficial to quickly eliminate background regions from consideration, in order to reduce the amount of processing needed to locate the head. As discussed, however, this typically involves analyzing the entire image to attempt to recognize various objects, or types of objects, in the image. It would be beneficial to utilize an approach that automatically removes at least some of the background objects, such that these objects do not need to be included in an object recognition or head location process. For example, in the situation 300 illustrated in FIG. 3, a user 308 is positioned at a typical distance from a computing device 302, with a set of objects 310 behind the user at a greater distance from the computing device. It should be understood that at least some of the relative dimensions in the image are exaggerated for purposes of explanation. In this example, the user 308 and background objects 310 are both within the fields of view of a pair of stereoscopic cameras 304, 306, or other such camera(s), such that distance (disparity) information can be obtained for each of these objects. When using a computing device, a user will typically be within a determined distance of the device, such as within about three feet of the device. In some embodiments, the user can also be determined to typically be at least a determined distance from the device, such as at least 30 cm, or at least six inches. Various other such distances can be used as well, as may depend upon factors such as the type of device or user preferences. Knowing this information enables at least one distance threshold 312 to be determined or selected, which allows objects (or portions of the image) to be segmented as foreground or background. In FIG. 3, the user 308 is closer to the computing device 302 than the threshold 312, such that the user is designated as a foreground object. The other objects 310 are further from the device than the threshold, which causes these objects to be designated as background objects. The corresponding portions of the image can then be handled accordingly, such as by only processing objects designated as foreground objects. In at least some embodiments, a stereo disparity map can be analyzed to determine pixel locations that are beyond the threshold, in order to exclude those portions of the image from consideration. Other segmentation approaches can be used to identify the user in an image, in accordance with various embodiments, where those processes can work on a single image, set of images, or other such data set.

Figure 4A:
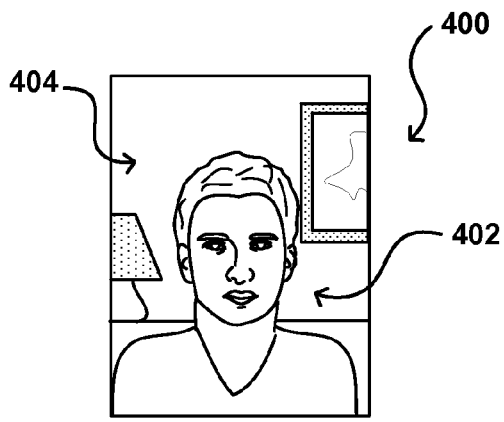
FIGS. 4(a), 4(b), 4(c), 4(d), 4(e), and 4(f) illustrate an example approach to determining a portion of an image corresponding to a user's head that can be utilized in accordance with various embodiments.
Figure 4B:
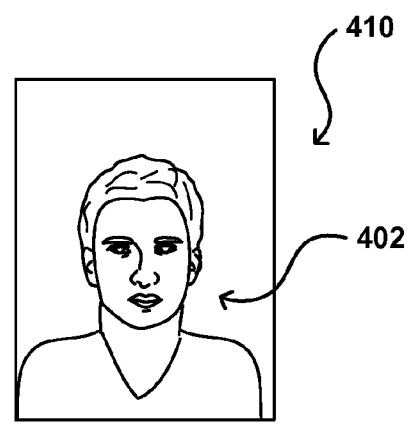

FIGS. 4(a) through 4(f) illustrate an example approach for using such information, which can help to locate the head of a user or viewer in at least some embodiments. FIG. 4(a) illustrates an example image 400 that can be captured by a camera of a computing device in accordance with various embodiments. As discussed, this can include a three-dimensional or stereoscopic image, or image data, captured by at least one pair of cameras or a stereo camera assembly on the computing device. As illustrated, there is a representation of a user 402 and representations of several other objects 404 in the image. Since distance information can be obtained for each part of the image, a threshold can be applied to identify a foreground portion, and a background or remaining portion of the image can be removed, such as is illustrated in the image state 410 of FIG. 4(b). It should be understood that the image in FIG. 4(b), as well as other images shown, do not need to be created and are presented for purposes of explanation, as in many cases the image data will be analyzed and processed without generating proper images for display. In this image state 410, data for the foreground portion corresponding to the representation of the user 402 is retained, with image data (e.g., pixel, color, or intensity data) for the other portions being removed from consideration. In this way, object recognition or feature detection algorithms can have a significantly reduced amount of data to process. It should be pointed out that reference numbers may be carried over for similar elements between figures, but such usage should not be interpreted as a limitation on the scope of the various embodiments unless otherwise stated.

Figure 4C:
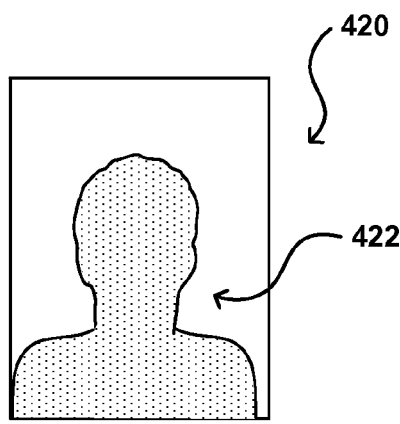

In many embodiments, however, the actual feature data of that portion of the image is not needed for head tracking and can be discarded or otherwise used only as needed. For example, once the foreground portion 422 of the image is located, as illustrated in FIG. 4(c), an outer shape or contour of that portion can be determined and used for calculating head location. In some embodiments, the threshold can be used to extract a binarized image of the user from the dense depth map, based at least in part upon the determined threshold. Using a depth map can make the process invariant to lighting conditions. Such an approach further significantly reduces the amount of data to be processed, and enables head position to be determined much more quickly, which allows for a higher frequency of head position determinations and thus a much more accurate and precise head tracking process. In some embodiments, the contour of the foreground portion can be analyzed without further processing, as any object within the threshold distance can be considered to be a user in some embodiments. In other embodiments, however, at least some analysis of the foreground portion can be performed to attempt to ensure that the proper contour is being analyzed. For example, a "head and shoulders" signature or pattern can be compared against the contour to attempt to determine whether the contour resembles a representation of a user. As an example, there might be a range of relative head, neck, and shoulder positions, shapes, ratios, and/or sizes, and the contour must match and/or fit within these ranges to be analyzed for head tracking. In other embodiments, where there might be more than one object detected as foreground, a process can attempt to separate the foreground into separate objects, using information such as distance, color, continuity, and other such information, and then select the largest object as the object to be analyzed. This can help to ensure that the user's head and shoulders are analyzed, instead of objects such as a user's hand or finger that might also be positioned near the computing device.

In at least some embodiments, standard image processing algorithms or image filters can be applied once the background is subtracted or otherwise removed or ignored, which can help to provide an acceptable region for the foreground portion. In some embodiments, a temporal filter can be applied to reduce temporal noise. Temporal filters are typically used to filter the raw image data, before other filtering or processing, to reduce noise due to, for example, motion artifacts. For each pixel in an image, a temporal filter can determine the spatial location of a current pixel and identify at least one collocated reference pixel from a previous frame. A temporal filter can also (or alternatively) process the image data to reduce noise by averaging image frames in the determined temporal direction. Other filters, such as a three frame median filter or box filter can be used as well, such as to remove discrete noise and/or smooth the shape of the foreground object, among other such options. A three-frame median filter can be used to attempt to provide noise reduction while preserving edges and other such features, as such a filter runs through the pixels of images in a set of three frames and replaces each pixel value with the median of the corresponding pixel values in the three frames. A box filter can be used to average the surrounding pixels to adjust pixel values, in some cases multiplying an image sample and a filter kernel to obtain a filtering result. The selection of an appropriate filtering kernel can enable different filtering to be applied, as may include a sharpen, emboss, edge-detect, smooth, or motion-blur filter to be applied. The quality of the segmentation then can be improved, in at least some embodiments, by applying a morphology opening or other such noise removal process, in order to attempt to remove any small holes or gaps in the contour.

Figure 4D:
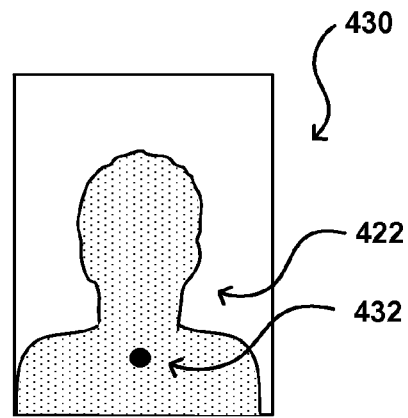
Figure 4E:
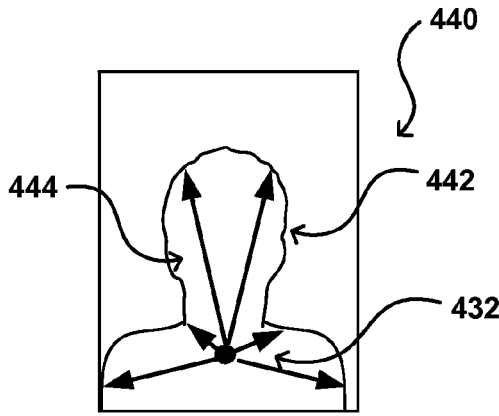
Figure 4F:
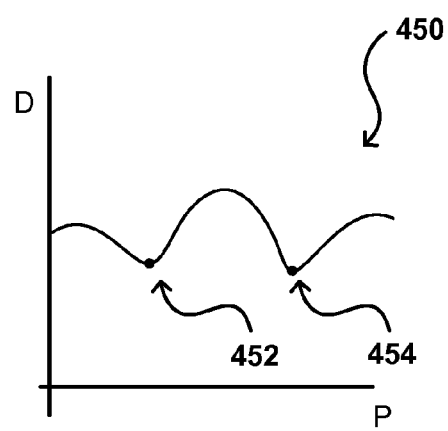
Figure 5A:
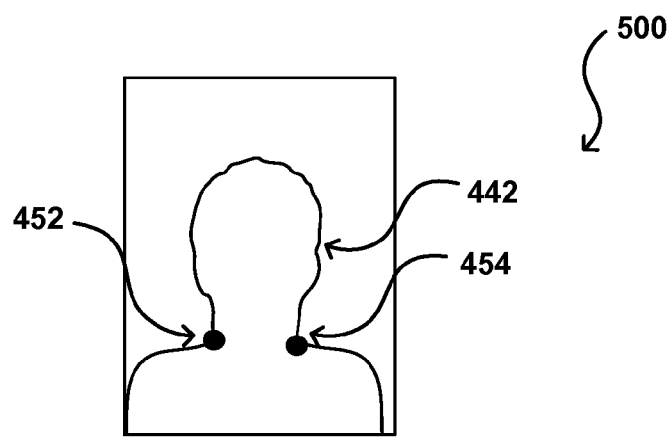
FIGS. 5(a), 5(b), 5(c), 5(d), 5(e), and 5(f) illustrate example approaches to determining a position of a user's head to use for head tracking that can be utilized in accordance with various embodiments.
Figure 5B:
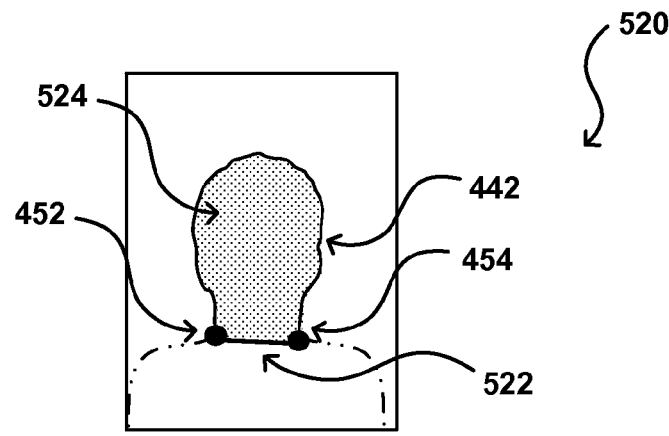
Figure 5C:
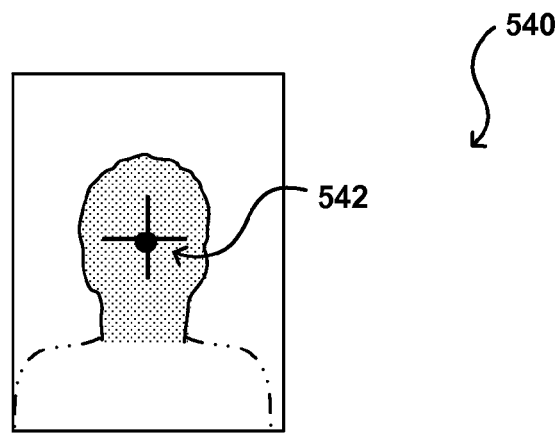
Figure 5D:
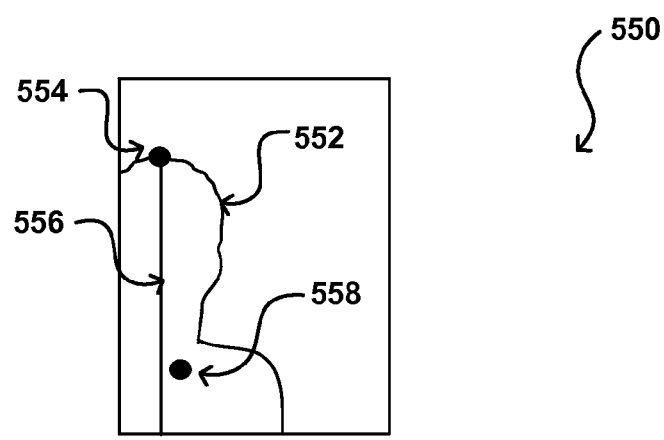
Figure 5E:
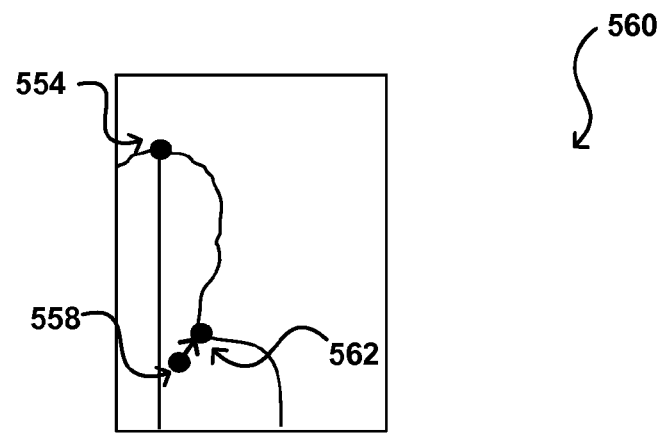
Figure 5F:
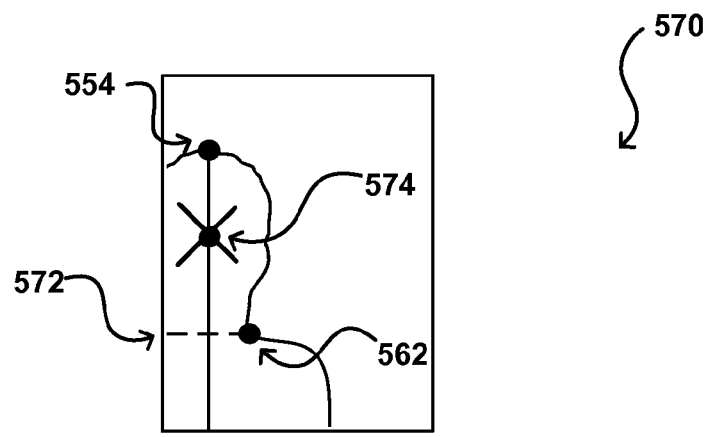

Once an appropriate contour is determined, a process can be used to attempt to identify a center of mass, central point within a central region or portion, or other center point 432 of the contour 422, as illustrated in the image state 430 of FIG. 4(d). In this example, a centroid calculation is performed to attempt to determine a center point in the image data relative to the positions of the pixels that make up the contour. The centroid generally refers to the arithmetic mean or average position of all the points along the contour, or within the foreground object portion of the image. The centroid of a finite set of n points $\{x_1, x_2, \ldots, x_n\}$ is given by, for a binary image:

$$C = \frac{x_1 + x_2 + \ldots + x_n}{n}$$

and the centroid coordinates of a plane figure can be computed in some embodiments using:

$$C_x = \frac{\sum C_{i_x} A_i}{\sum A_i}$$

$$C_y = \frac{\sum C_{i_y} A_i}{\sum A_i}$$

Once a center point such as a centroid has been located, the distance from that center point to each (or at least a subset) of the pixel locations along the contour can be determined. For example, the image state 440 of FIG. 4(*e*) illustrates the center point 432 and the contour 442, with various distances 444 (i.e., vector lengths) from the center point 432 to pixel locations along the contour being determined. As illustrated, the distance from the center point 432 to points where the neck, head, or hair of the user (or other such feature) meet the shoulders should, in general, be the shortest of the measured differences. Thus, the distances can be used to quickly determine one or more approximate locations where the head or neck of the user meets the user's shoulders. FIG. 4(*f*) illustrates an example plot 450 that could be generated using the distance data generated using the center point. The plot shows distance from the center point, moving left to right along the contour. As illustrated, assuming noise and gaps have been removed using image processing where necessary, as discussed elsewhere herein, there should generally be two minima 452, 454 (local or global) that correspond to the shoulder points. In the case of an obstruction or partial view, only one such minimum may be visible, but in at least some embodiments this still can be sufficient to determine the portion of the foreground that should be interpreted as the head region. Once the transition points are located their coordinates (in two or three dimensions) can be determined from the corresponding pixel locations in the image.

FIGS. 5(*a*) through 5(*c*) illustrate a portion of the approach for determining the head position once a head portion of the contour has been determined. For example, FIG. 5(*a*) illustrates an image state 500 illustrating the transition points 452, 454 (corresponding to the neck/shoulder transitions) that are the shortest distance along the contour 452 from the determined center point. As illustrated, the portion of the contour 442 between these points corresponds primarily to the head of the user, although the portion can also include portions of a neck, hair, collar, hood, or other such objects that also may generally be associated with the head of the user. For purposes such as head location and tracking, however, these extra object portions should not affect the head position determination to the point where the determination of exact head position will be negatively impacted. If greater precision is needed, however, other approaches can be used instead of, or in addition to, at least a portion of this approach as discussed elsewhere herein. The image state 520 illustrated in FIG. 5(*b*) illustrates the portion of the contour 442 that is "above" the transition points 452, 454, with an area 524 defined by that portion of the contour 442 and a line segment 522 between the transition points.

From the portion of the contour 442 between the transition points 452, 454, or the area 524 defined by that region, another centroid 542 or other such point can be calculated, as illustrated in the image state 540 of FIG. 5(*c*). As illustrated, the location of this centroid 542 is close to a central location of the head, affected by factors such as the amount of neck considered, hair length considered, etc. For many purposes, such a determination can be a sufficient determination and/or approximation of head position for tracking purposes. If so, information such as the coordinates of the centroid 542 or direction information associated with that centroid (using geometric information such as a separation of cameras and/or location of the camera(s) on the device) can be provided as the current head position, for example, which then can be used for head tracking or other such purposes within the scope of the various embodiments. Paths of motion can also be determined by comparing the current position to previously determined positions, which can be used to provide for gesture or motion input and the like.

It is also possible that a portion of the head may be obscured, such as by being at least partially occluded by a portion of the camera aperture, or may be located in shadow or otherwise unavailable or unsuitable for imaging and/or analysis. Accordingly, an approach can be utilized that can locate approximate head position in cases where the head is partially occluded as well as cases where the head is not occluded. FIG. 5(*d*) illustrates an example situation 550 where a portion of the left side of the user's head (in the image) is occluded and not represented in the captured image. As with the previous approach, initial steps such as obtaining the dense stereo disparity map, applying a temporal median filter, applying a box filter for smoothing, and binarizing the image using a threshold to remove background objects can be performed to attempt to isolate one or more foreground objects. A contour 552 of the largest foreground object then can be determined. In this approach, a highest point 554 of the contour can then be determined. In some embodiments, this may correspond to the highest point with at most a maximum allowed uncertainty, in order to minimize the effects of noise. This point likely will correspond (within an acceptable amount of deviation) to the approximate location of the top of the user's head. An imaginary line 556 then can be constructed from that highest point 554, which can effectively divide the foreground object into left and right portions. A centroid 558 of the contour can be calculated, and the portion containing the centroid 558 can be selected for analysis.

As in the previously discussed approach, the distances from the centroid to points along the contour for the selected half can be analyzed to locate the point 562 along the selected portion of the contour that is the shortest distance from the centroid 558, as illustrated in the example situation 560 of FIG. 5(*e*). This will likely correspond to a shoulder or transition point. Once the transition point 562 is located, the height 572 or vertical location of that transition point can be determined, and compared to the height of the highest point 554 along the contour, as illustrated in the example situation 570 of FIG. 5(*f*). The center point 574 along the imaginary line between the highest point 554 and the transition height 572 then can be selected as the location of the head. The coordinates of this point then can be used for head tracking or other such purposes, as discussed elsewhere herein. Other locations can be determined as well, such as may rely upon the portion of the contour visible in the image data.

As mentioned, in some embodiments a higher level of precision may be required. In such cases, the transition points and/or head centroid location can be used to designate a portion and/or starting point for an image to be analyzed. From this, a feature, shape, or object recognition algorithm, or other such process, can attempt to identify one or more specific locations for tracking purposes. For example, this could be the mid-point between the viewer's eyes or another such location, which can potentially provide for more accurate tracking that other processes discussed herein.

Other object recognition processes can be used as well within the scope of the various embodiments. These can include, for example, appearance-based processes that search for features such as edges, changes in lighting or color, or changes in shape or size. Various other approaches utilize gradient generation and matching or histogram analysis for object recognition. Other approaches include feature-based approaches, such as may utilize interpretation trees, geometric hashing, or invariance analysis. Algorithms such as scale-invariant feature transform (SIFT) or speeded up robust features (SURF) algorithms can also be used within the scope of the various embodiments. For computer vision applications, a bag of words or similar approach can also be utilized.

Figure 6A:
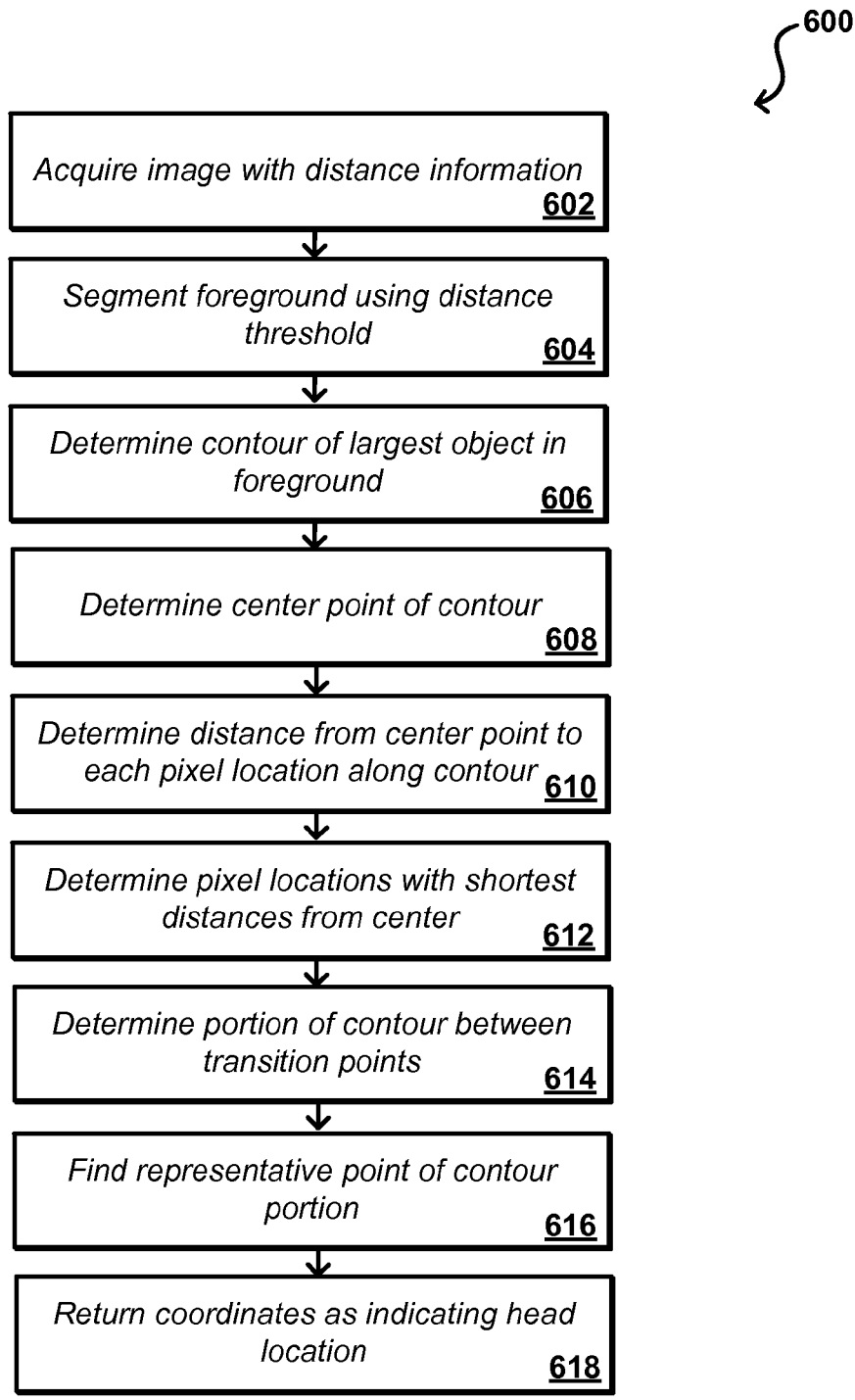
FIGS. 6(a) and 6(b) illustrates example processes for determining a head location that can be utilized in accordance with various embodiments.

FIG. 6(a) illustrates a first example process 600 for locating a head of a viewer of a computing device that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, head detection and/or tracking is activated on a computing device. The tracking can be activated at startup, upon opening an application, in response to a user action, or at any other appropriate time. Approaches for locating and tracking other objects can be used as well as discussed elsewhere herein. In this example, image data is acquired 602 along with distance information. As discussed, this can include capturing three-dimensional image data including disparity information, or using a proximity sensor, structured light component, or other such component to capture distance information along with two-dimensional image data. Various other approaches can be used as well. In some embodiments, the image(s) can be acquired using one or more conventional cameras on a computing device, while in some embodiments the image(s) can be acquired using one or more relatively low power cameras, as may capture IR light at a relatively low resolution (e.g., 2MP or less) and color depth (e.g., monochrome) in at least some embodiments. As known in the art, the color depth of an image is generally determined by the number of bits or other such measure used to indicate the color of a single pixel and/or to indicate the number of bits used for each color component of a pixel. Color depth generally refers to how finely the levels of color can be expressed, or the range of colors that can be expressed. The image data can be analyzed to attempt to segment 604 the image data into at least a foreground portion and a background portion, using at least one determined distance threshold. As discussed, the threshold can be a fixed threshold or variable threshold, as may be determined based on various image conditions or environmental values. For example, if no objects are detected within three feet of the device then the threshold might be set to some multiple of the closest distance of an object to the device. Similarly, if an application such as a video game is running the threshold might be closer to the device than when a movie is playing, where a viewer might typically be further from the device.

Once a foreground portion of the image is determined, a contour of the largest object (if more than one) in the foreground is determined 606. This can include processing the image, to attempt to smooth edges and remove gaps in the image, and then determining an outer edge of the object in the image. As discussed, in at least some embodiments a determination can be used as to whether the object matches, within an allowable deviation, a head and shoulders pattern or signature. Once the contour is determined, a center point can be determined 608, such as by calculating a centroid of the contour in the image. The distance from the center point to at least a subset of the pixel locations along the contour can be determined 610, and the pixel locations that are the shortest distances from the center point can be determined 612. In most cases, the transition points will be different distances from the center point, so a process might take the points with the two shortest distances, points within a given range of distances, points located substantially symmetrically with respect to the center point, etc. As mentioned, smoothing can attempt to remove false positives due to noise in the image, and in some embodiments points with more than an acceptable amount of uncertainty may be removed from the minimum distance calculation. As mentioned, some images might only have one such point, where the other transition point might be out of the image or at least partially obscured, etc. Once the location of the transition points corresponding to the shortest distances are determined, the portion of the contour between (i.e., above) those points can be determined 614, which in most cases should represent that portion of the contour that is substantially related to the user's head and/or neck region(s). As discussed, in the case of an obfuscation or other such issue only one such transition point may be determinable. Using the "head" portion of the contour, a centroid or other such representative (e.g., central) point can be determined 616. Coordinates or other information associated with the representative point then can be returned 618 as indicating the current head position of the user or viewer, at least with respect to the computing device. As discussed, the position information then can be used for purposes such as head tracking, motion input, and the like.

Figure 6B:
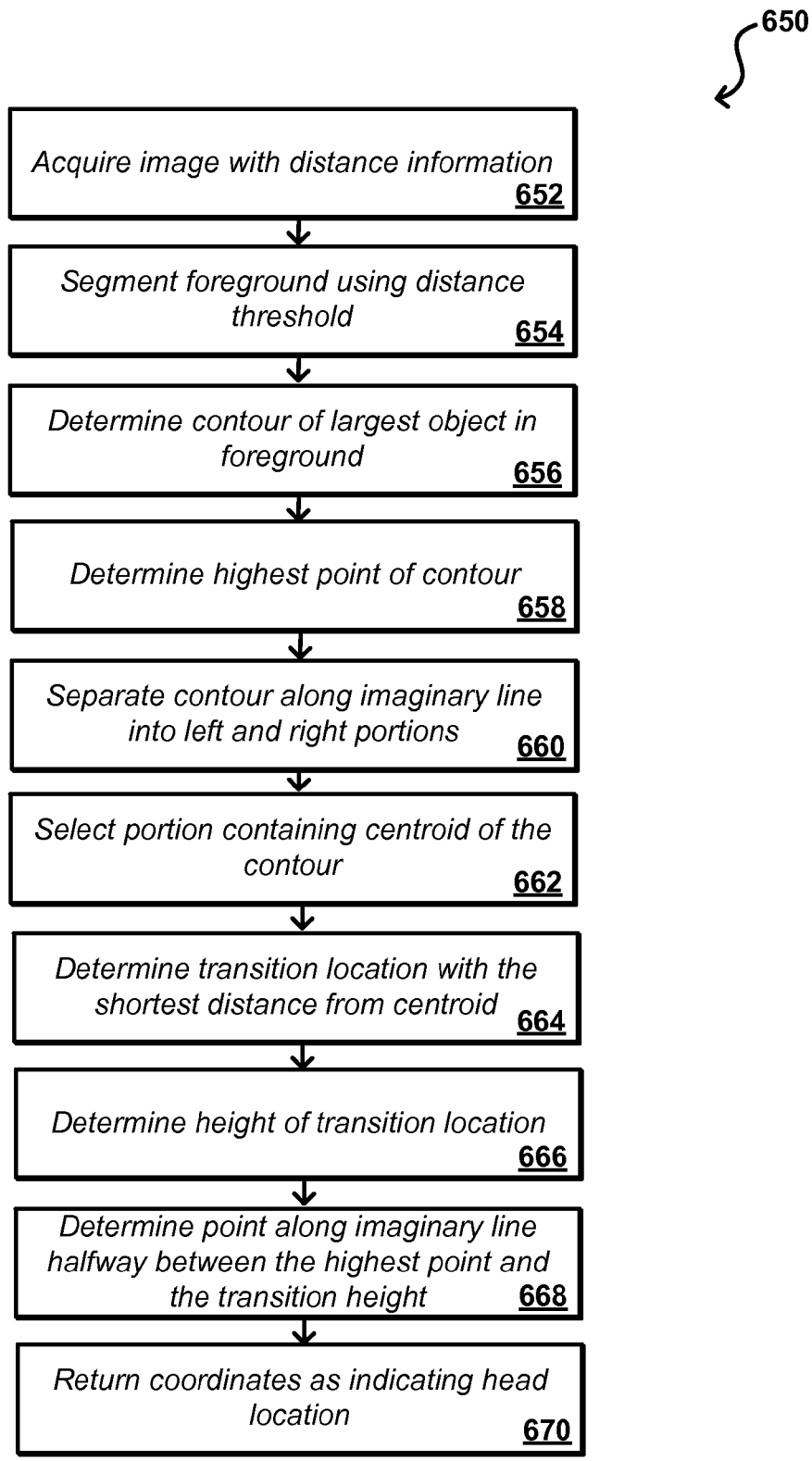

FIG. 6(b) illustrates a second example approach 650 for locating a head of a viewer of a computing device that can be utilized in accordance with various embodiments. In this example, head detection and/or tracking is activated on a computing device as discussed previously. Image data is acquired 652 along with distance information. The image data can be analyzed to attempt to segment 654 the image data into at least a foreground portion and a background portion, using at least one determined distance threshold. As discussed, initial steps such as obtaining the dense stereo disparity map, applying a temporal median filter, applying a box filter for smoothing, and binarizing the image using a threshold to remove background objects can be performed to attempt to isolate one or more foreground objects. The threshold can be a fixed threshold or variable threshold, as may be determined based on various image conditions or environmental values.

Once a foreground portion of the image is determined, a contour of the largest object (if more than one) in the foreground is determined 656. This can include processing the image, to attempt to smooth edges and remove gaps in the image, and then determining an outer edge of the object in the image. As discussed, in at least some embodiments a determination can be used as to whether the object matches, within an allowable deviation, a head and shoulders pattern or signature. Once the contour is determined, a highest point of the contour is determined 658, and the contour is separated 660 into left and right (or other such) portions using an imaginary line running through the highest point. A centroid (or other central point) of the contour be determined, and the portion containing the centroid can be selected 662 for analysis, as the portion containing the centroid likely will correspond to the least occluded portion of the user. The transition point corresponding to the approximate transition from the neck to the shoulders can be determined 664, and the height (or y-coordinate, etc.) of that transition point determined 666. A point along the imaginary line that is halfway between the transition height and the highest point can be determined 668, and selected as the approximate location of the head at the time the image was captured. The coordinates of this selected point then can be returned as the "current" location of the head of the user.

Figure 7:
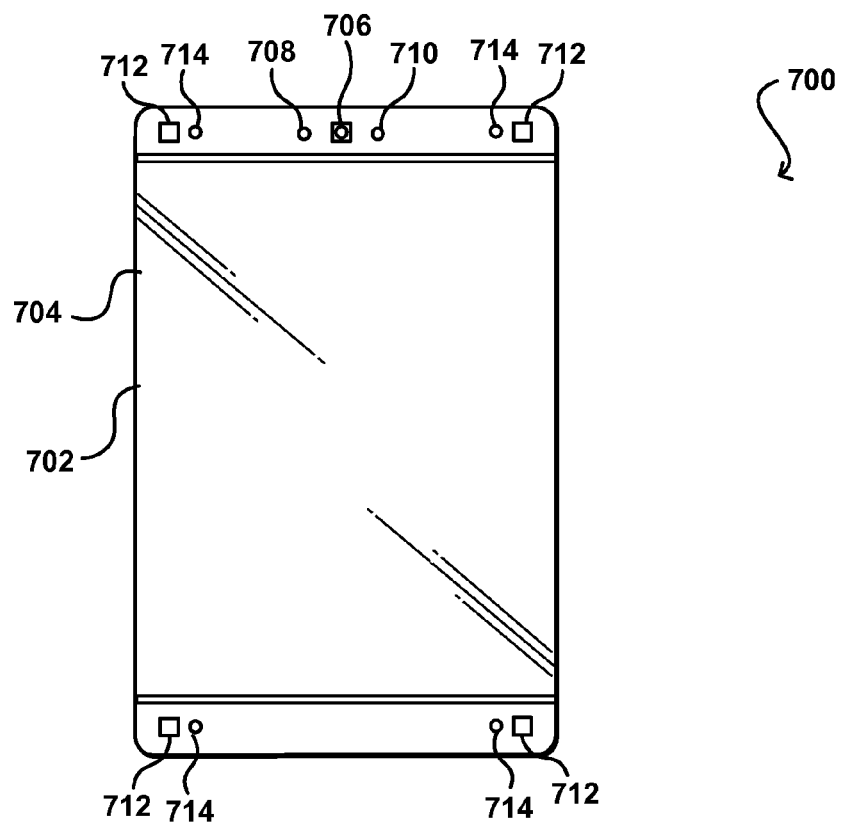
FIG. 7 illustrates an example computing device that can be utilized in accordance with various embodiments.

FIG. 7 illustrates a front view 700 of an example computing device 702 that can be used to perform methods in accordance with various embodiments discussed and suggested herein. In this example, the device has a front-facing camera 706 (i.e., a camera on the same side of the device as a display screen 704) that can be used for purposes such as video conferencing. Along with the camera, the device can also have elements such as a light sensor 708 for determining an amount of ambient light around the device, and a white light LED 710 or other such light source capable of operating as a flash, or otherwise providing light for the front-facing camera 706. The computing device also includes four camera sensors 712, which in this example can have a lower resolution, power requirement, and/or color depth than the front-facing camera 706. Such sensors can be used for purposes such as head tracking and gesture input, for example, which can require image data to be captured over a period of time but do not require full or higher resolution images. Along with each (or at least some) of these camera sensors 712 can also be a light source, such as an IR LED 714, that can emit IR that, when reflected, can be directed back toward at least the associated camera sensor 712. Placing the LEDs near the sensors can have the advantage that objects, such as human eyes, that function as retro-reflectors can enable those objects to be detected by the adjacent sensors in the captured image data. In at least some embodiments, the distance between a camera sensor and an LED can be at least 1-2 mm. It should be understood that reference numbers for similar elements can be used within a figure, or carried over between figures, for purposes of explanation and ease of understanding, but that such use should not be read as a limitation on the scope of the various embodiments unless otherwise stated.

Figure 8:
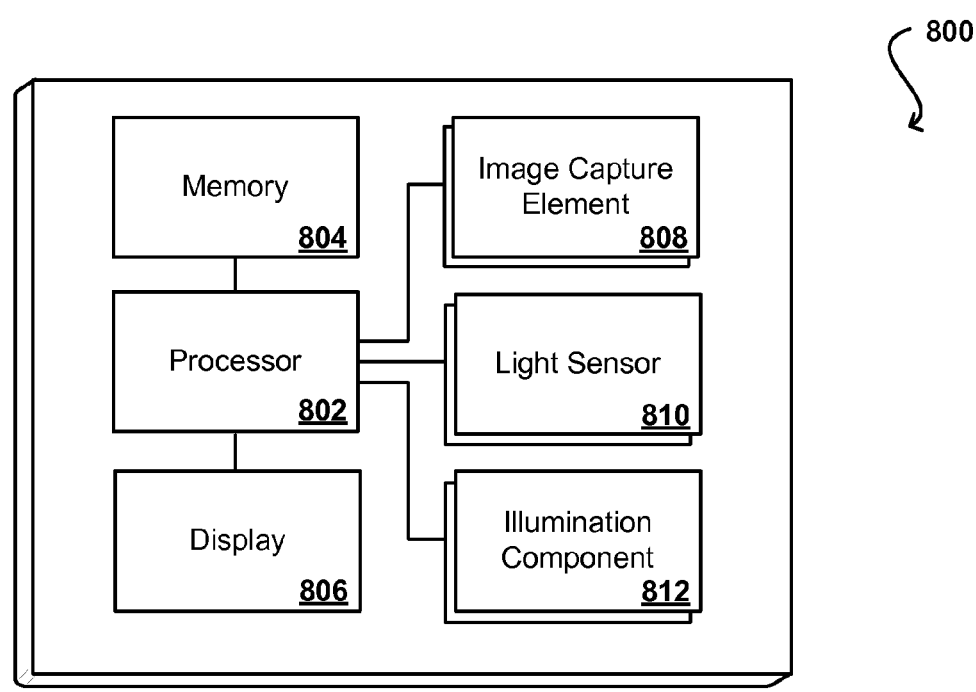
FIG. 8 illustrates an example set of basic components of a portable computing device, such as the device described with respect to FIG. 7.

In order to provide various functionality described herein, FIG. 8 illustrates an example set of basic components of a computing device 800, such as the device 702 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed, the device in many embodiments will include at least two image capture elements 808, such as two or more cameras (or at least one stereoscopic camera) that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example computing device includes at least one light sensor 810 which determine the need for light when capturing an image, among other such functions. The example device 800 includes at least one illumination component 812, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 9:
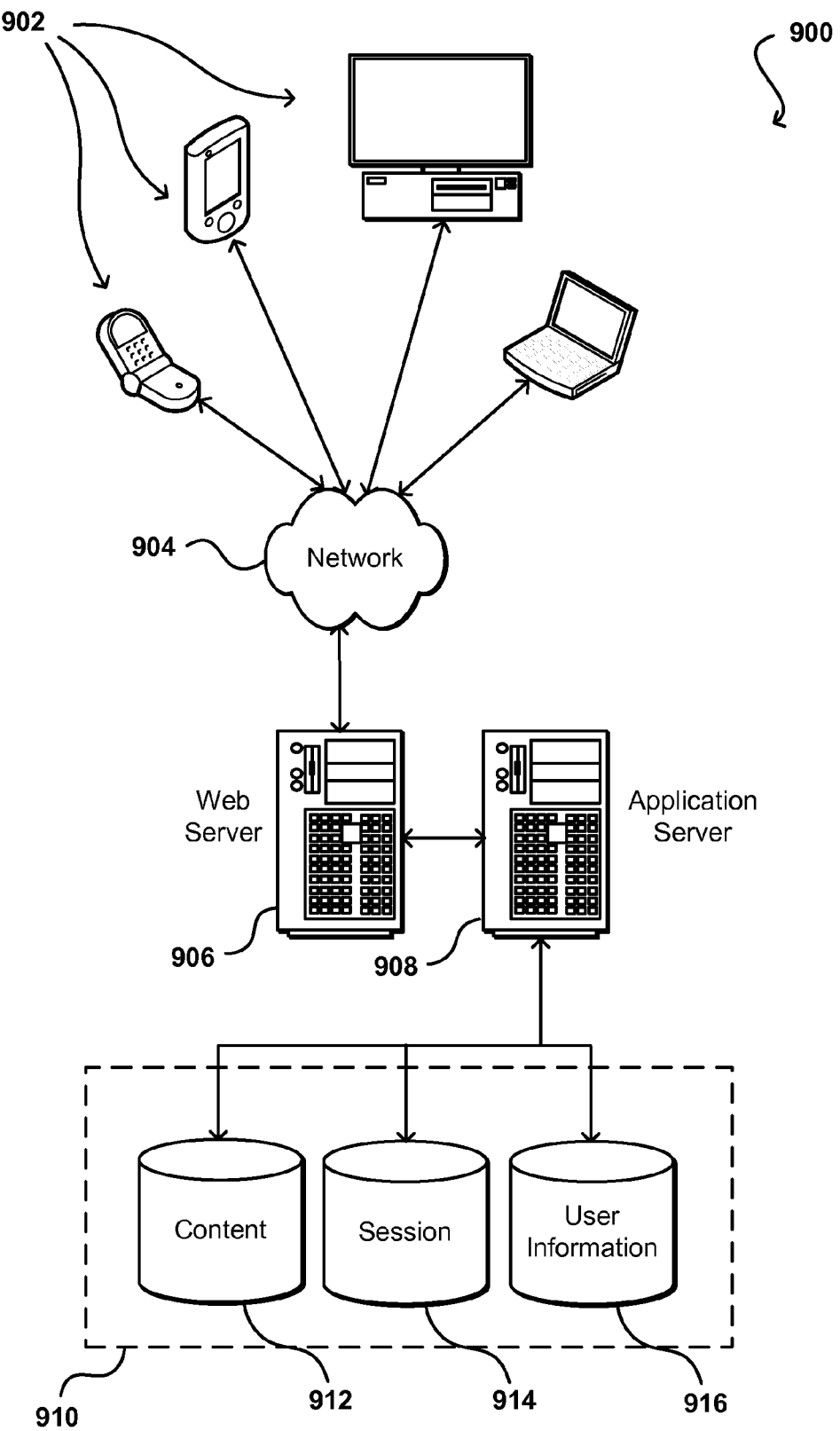
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a camera; and
   memory including instructions that, when executed by the at least one processor, cause the computing device to:
   acquire an image using the camera, the image including a representation of a plurality of objects;
   acquire distance information for the plurality of objects;
   determine a foreground portion and a background portion of the image, the foreground portion representing at least one object of the plurality of objects that is closer than a threshold distance to the computing device, based at least in part upon the distance information for the at least one object;
   locate a head and shoulder shape of a person represented in the foreground portion;
   determine a contour of the head and shoulder shape;
   determine a first center point of the head and shoulder shape;
   determine a respective distance from the first center point to each pixel location of a plurality of pixel locations along the contour;
   determine a first transition point and a second transition point along the contour, the first transition point having a shortest distance to the first center point and the second transition point having a next shortest distance to the first center point;
   determine a head shape by segmenting the head and shoulder shape between the first transition point and the second transition point;
   determine a head position of the person as a second center point of the head shape; and
   perform a head tracking process.

2. The computing device of claim 1, wherein the instructions when executed further cause the computing device to:
   determine a set of pixels corresponding to the contour of the head and shoulder shape, each pixel of the set of pixels having a respective set of coordinates with respect to the image; and
   calculate a centroid location with respect to the set of pixels, the centroid location being selected as the first center point of the head and shoulder shape.

3. The computing device of claim 1, wherein the instructions when executed further cause the computing device to:
   identify the head and shoulder shape as a largest object represented in the foreground portion; or
   determine that the head and shoulder shape matches a head and shoulders pattern.

4. The computing device of claim 1, wherein the instructions when executed further cause the computing device to:
   determine a set of coordinates associated with the second center point; and
   provide the set of coordinates to the head tracking process as a current head position.

5. The computing device of claim 4, wherein the instructions when executed further cause the computing device to:
   locate an outer edge region of at least a portion of the head and shoulder shape represented in the image; and determine a set of contour pixels representative of the outer edge region, the set of contour pixels defining the contour of the head and shoulder shape.

6. A computer-implemented method, comprising:
acquiring image data using a camera and a computing device, the image data including a representation of a plurality of objects;
acquiring distance information for the plurality of objects;
determining a foreground portion and a background portion of the image data, the foreground portion representing at least one object of the plurality of objects that is closer than a threshold distance to the computing device, based at least in part upon the distance information for the at least one object;
determining at least a portion of a head and shoulder shape of a person represented in the foreground portion;
determining a first center point of the head and shoulder shape;
determining a contour of the head and shoulder shape;
determining a plurality of distances from the first center point to a plurality of points along the contour;
determining at least one first point that is closer to the first center point of the contour than other points of the plurality of points using the plurality of distances;
determining a head shape by segmenting the head and shoulder shape between the first point that is closer to the first center point of the contour than other points of the plurality of points using the plurality of distances;
determining a head shape by segmenting the head and shoulder shape between the first point and a second point along the contour; and
determining a second center point of the head shape as a location of the head of the person; and
performing a head tracking process.

7. The computer-implemented method of claim 6, further comprising:
determining disparity data from the three image data;
determining distance information for one or more objects represented in the image data using the disparity data; and
determining a foreground portion and a background portion of the image data using the distance information.

8. The computer-implemented method of claim 7, further comprising:
locating a foreground object represented in the foreground portion from among the one or more objects that are closer than a threshold distance to one or more cameras used to acquire the image data.

9. The computer-implemented method of claim 6, further comprising:
processing the contour using at least one image filter before determining the at least one first point, the at least one image filter including at least one of a temporal filter, a median filter, a box filter, a morphology opening process, or a noise removal process.

10. The computer-implemented method of claim 6, further comprising:
performing a first centroid calculation to determine the first center point; and
performing a second centroid calculation to determine the second center point.

11. The computer-implemented method of claim 8, further comprising:
identifying the head and shoulder shape by selecting a largest foreground object or determining that the foreground object matches a head and shoulders pattern.

12. The computer-implemented method of claim 6, further comprising:
determining the plurality of points from a set of contour pixels defining the contour.

13. The computer-implemented method of claim 8, further comprising:
determining that the foreground object corresponds to at least the portion of the head and shoulder shape using at least one of a face detection algorithm, a facial recognition algorithm, a feature detection algorithm, or a pattern matching algorithm.

14. A non-transitory computer-readable storage medium including instructions that, when executed by at least one processor of a computing device, cause the computing device to:
acquire an image data using a camera, the image data including a representation of a plurality of objects;
acquire distance information for the plurality of objects;
determine a foreground portion and a background portion of the image data, the foreground portion representing at least one object of the plurality of objects that is closer than a threshold distance to the computing device, based at least in part upon the distance information for the at least one object;
locate a head and shoulder shape of a person represented in the foreground portion;
determine a contour of the head and shoulder shape;
determine a first center point of the head and shoulder shape;
determine a plurality of distances from the first center point to a plurality of points along the contour;
determine at least one first point that is closer to the first center point of the contour than other points of the plurality of points using the plurality of distances;
determine a head shape by segmenting the head and shoulder shape between the first point and a second point along the contour; and
determine a second center point of the head shape as a location of the head of the person; and
perform a head tracking process.

15. The non-transitory computer-readable storage medium of claim 14, wherein the instructions when executed further cause the computing device to:
compare a foreground object to a head and shoulders signature to verify that the foreground object corresponds to at least the contour of the head and shoulder shape.

16. The non-transitory computer-readable storage medium of claim 14, wherein the instructions when executed further cause the computing device to:
determine a foreground portion of the image data at least in part by segmenting a stereo disparity map associated with the image data to determine pixel locations that correspond to distances closer than a threshold distance.

17. The non-transitory computer-readable storage medium of claim 14, wherein the instructions when executed further cause the computing device to:
extract the head and should shape from a binarized portion of a depth map of the image data.

18. The non-transitory computer-readable storage medium of claim 14, wherein the instructions when executed further cause the computing device to:
process the contour using at least one filter before determination of the at least one first point, the at least one filter including at least one of a temporal filter, a median filter, a box filter, a morphology opening process, or a noise removal process.

19. The non-transitory computer-readable storage medium of claim 14, wherein the instructions when executed further cause the computing device to:
perform a first centroid calculation to determine the first center point; and
perform a second centroid calculation to determine the second center point.

20. The non-transitory computer-readable storage medium of claim 16, wherein the instructions when executed further cause the computing device to:
determine the threshold distance based upon at least one of an imaging condition or an environmental condition.

* * * * *